(12) United States Patent
Shinagawa et al.

(10) Patent No.: US 10,272,564 B2
(45) Date of Patent: Apr. 30, 2019

(54) ARTICULATED INDUSTRIAL ROBOT WITH DOWNSIZED JOINT UNIT

(71) Applicant: FANUC CORPORATION, Yamanashi (JP)

(72) Inventors: Masahide Shinagawa, Yamanashi (JP); Satoshi Kinoshita, Yamanashi (JP); Yasuyoshi Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 278 days.

(21) Appl. No.: 15/386,128

(22) Filed: Dec. 21, 2016

(65) Prior Publication Data

US 2017/0182655 A1 Jun. 29, 2017

(30) Foreign Application Priority Data

Dec. 24, 2015 (JP) ................................. 2015-251628

(51) Int. Cl.
| | |
|---|---|
| *B25J 17/00* | (2006.01) |
| *B25J 17/02* | (2006.01) |
| *B25J 18/00* | (2006.01) |
| *B25J 9/10* | (2006.01) |
| *B25J 9/12* | (2006.01) |

(Continued)

(52) U.S. Cl.
CPC ............ *B25J 9/102* (2013.01); *B25J 9/0009* (2013.01); *B25J 9/12* (2013.01); *F16H 19/001* (2013.01);

(Continued)

(58) Field of Classification Search
CPC .......... H02K 5/22; H02K 5/163; H02K 7/003; H02K 7/006; H02K 7/085; H02K 7/10;

(Continued)

(56) References Cited

U.S. PATENT DOCUMENTS

| | | | |
|---|---|---|---|
| 4,589,816 A | | 5/1986 | Eberle et al. |
| 4,708,027 A | * | 11/1987 | Stenner ................. F16H 57/033 403/373 |

(Continued)

FOREIGN PATENT DOCUMENTS

| | | |
|---|---|---|
| CN | 102452078 A | 5/2012 |
| CN | 103978476 A | 8/2014 |

(Continued)

OTHER PUBLICATIONS

Notification of Reasons for Refusal for Japanese Application No. 2015-251628, dated Jan. 9, 2018, including English translation, 7 pages.

*Primary Examiner* — William Kelleher
*Assistant Examiner* — T. Scott Fix
(74) *Attorney, Agent, or Firm* — RatnerPrestia

(57) ABSTRACT

A robot with a downsized joint unit is disclosed. The articulated robot includes a motor which is provided with a gear or a pulley at an end of a motor shaft, and which generates a force for driving a joint, a speed reduction mechanism which reduces the speed of rotation of the gear or pulley rotating integrally with the motor shaft, and a supporting member which supports the motor and the speed reduction mechanism, and which defines an interior space for accommodating the motor, wherein the supporting member has an opposing face opposing the motor in the interior space and spreading in a plane perpendicular to the motor shaft, and the opposing face includes a groove-like recessed portion recessed in a protruding direction of the motor shaft and extending in a direction perpendicular to the motor shaft.

6 Claims, 15 Drawing Sheets

(51) Int. Cl.
*F16H 19/00* (2006.01)
*F16H 57/02* (2012.01)
*B25J 9/00* (2006.01)

(52) U.S. Cl.
CPC ... *F16H 57/02* (2013.01); *F16H 2057/02034* (2013.01); *F16H 2057/02073* (2013.01); *Y10S 901/23* (2013.01); *Y10S 901/25* (2013.01)

(58) Field of Classification Search
CPC ....... H02K 7/1004; H02K 7/116; B25J 9/102; B25J 9/1025
USPC ............................... 74/421 A, 606 R; 310/89
See application file for complete search history.

(56) References Cited

U.S. PATENT DOCUMENTS

| | | | | |
|---|---|---|---|---|
| 4,969,795 A | * | 11/1990 | Toyoda | B25J 9/047 414/744.2 |
| 5,148,715 A | * | 9/1992 | Blaser | B41F 31/045 464/30 |
| 2005/0217418 A1 | * | 10/2005 | Dismon | F16H 57/02 74/606 R |
| 2006/0028164 A1 | | 2/2006 | Kono et al. | |

FOREIGN PATENT DOCUMENTS

| | | |
|---|---|---|
| JP | H02059281 A | 2/1990 |
| JP | H03029974 Y | 6/1991 |
| JP | H06190769 A | 7/1994 |
| JP | H07124883 A | 5/1995 |
| JP | H07227792 A | 8/1995 |
| JP | H11136898 A | 5/1999 |
| JP | 2006043848 A | 2/2006 |
| JP | 2009050971 A | 3/2009 |
| JP | 2010131712 A | 6/2010 |
| JP | 2011148076 A | 8/2011 |
| JP | 2012161887 A | 8/2012 |
| JP | 2013-006271 A | 1/2013 |

* cited by examiner

ARTICULATED INDUSTRIAL ROBOT WITH DOWNSIZED JOINT UNIT

BACKGROUND OF THE INVENTION

1. Field of the Invention

The present invention relates to an articulated industrial robot.

2. Description of the Related Art

There exists a need to reduce the size of an articulated industrial robot. On the other hand, a need exists to provide space for replacing a robot component, for example, a motor. In view of these needs, it is important that not only the size of the robot but also the installation space for the robot, including the space allowed for replacement work, be reduced.

An industrial robot is known which is constructed so that a motor can be removed for replacement by moving the motor slidingly along the direction of its axis (for example, refer to Japanese Unexamined Patent Publication No. 2013-006271).

FIG. 14 shows a joint unit 116 of a robot according to the prior art. The joint unit 116 includes a motor 120, a speed reduction mechanism 140, and a supporting member 130 for supporting the motor 120 and the speed reduction mechanism 140. A motor shaft 124 is provided at the end with a gear 142. The gear 142 engages with the speed reduction mechanism 140 which is connected to a driven member driven by the motor 120 so that power is transmitted from the motor 120 to the driven member.

When removing the motor 120 from the supporting member 130 for such purposes as replacement or inspection of the motor 120, the motor 120 is first moved in the direction of its axis (see arrow A in FIG. 14) to detach it from the supporting member 130, and the motor 120 is then moved slidingly along a direction (see arrow B in FIG. 14) at a right angle to the axial direction.

Therefore, the motor 120 cannot be removed from the supporting member 130 smoothly, unless the overall length L1' of the motor 120 is smaller than the dimension L2' of the interior space of the supporting member 130 measured along the axis direction. FIG. 15 shows the case in which the relation L1'<L2' is true; in this case, the motor 120 can be easily removed from the supporting member 130.

On the other hand, FIG. 16 shows the case in which the relation L1'>L2' is true; in this case, the motor 120 cannot be removed from the supporting member 130, because the motor shaft 124 or the gear 142 interferes with the supporting member 130.

FIG. 17 shows a portion of the configuration of a robot 100 according to the prior art. The robot 100 includes a first supporting member 230 and a second supporting member 330. The first supporting member 230 supports a first motor 220 and a first speed reduction mechanism 240. The second supporting member 330 supports a second motor 320 and a second speed reduction mechanism 340.

As in the above-described prior art, the first motor 220 can be removed from the first supporting member 230 by pulling it in the direction of its axis (see arrow A in FIG. 17). However, in the configuration shown here, since the second motor 320 is located in the axial direction of the first motor 220, the first motor 220 may interfere with the second motor 320 when removing the first motor 220 from the first supporting member 230.

Referring to FIG. 18, there is shown the case in which the distance L2' from the mounting surface of the first motor 220 to the second motor 320 is shorter than the overall length L1' of the first motor 220. In this case, when trying to remove the first motor 220 from the first supporting member 230, the first motor 220 interferes with the second motor 320. Accordingly, when replacing the first motor 220, the second motor 320 must also be removed, which can degrade the work efficiency or can cause damage to the first motor 220 or the second motor 320.

In contrast, in the example shown in FIG. 19, the second supporting member 330 is enlarged to ensure a sufficient distance between the first supporting member 230 and the second motor 320. In this case, the first motor 220 can be removed from the first supporting member 230 without causing interference with the second motor 320. However, since the second supporting member 330 is enlarged, the size of the robot 100 correspondingly increases, resulting in an inability to address the need for size reduction.

SUMMARY OF THE INVENTION

There is therefore a need for a robot that allows for downsizing of a joint unit, while facilitating replacement of a motor.

According to the present invention, there is provided an articulated industrial robot, wherein the articulated robot includes a motor which is provided with a gear or a pulley at an end of a motor shaft, and which generates a force for driving a joint, a speed reduction mechanism which reduces the speed of rotation of the gear or pulley rotating integrally with the motor shaft, and a supporting member which supports the motor and the speed reduction mechanism, and which defines an interior space for accommodating the motor, and wherein the supporting member has an opposing face opposing the motor in the interior space and spreading in a plane perpendicular to the motor shaft, and the opposing face includes a groove-like recessed portion recessed in a protruding direction of the motor shaft and extending in a direction perpendicular to the motor shaft.

In a preferred embodiment, the recessed portion has a width larger than a diameter of the gear or pulley, and the recessed portion has a depth such that a dimension between the recessed portion and a component of the articulated robot located at the shortest distance from the recessed portion as measured in a direction parallel to the motor shaft becomes larger than an overall length of the motor including the motor shaft.

In a preferred embodiment, the recessed portion includes a through-hole through which the motor shaft and the gear or pulley can be inserted, and the gear or pulley is connected to the speed reduction mechanism at a position protruding from the through-hole.

In a preferred embodiment, the articulated robot further includes a sealing member which is provided between the recessed portion and the motor.

BRIEF DESCRIPTION OF THE DRAWINGS

These and other objects, features, and advantages of the present invention will become more apparent from the detailed description of the illustrative embodiments as set forth below with reference to the accompanying drawings, wherein.

DETAILED DESCRIPTION

Figure 1:
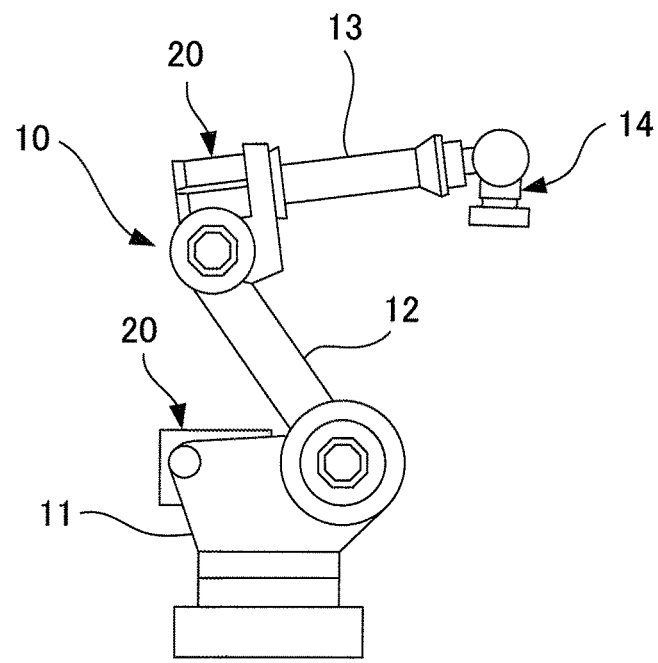
FIG. 1 is a diagram showing the configuration of a robot according to one embodiment.

Embodiments of the present invention will be described below with reference to the accompanying drawings. To aid understanding of the present invention, the scale of the drawn component elements of the illustrated embodiments has been changed as necessary. Further, identical reference numerals are used to designate identical or corresponding component elements.

FIG. 1 is a diagram showing the configuration of a robot according to one embodiment. The robot 10 is a vertically articulated robot which includes a swivel body 11, a lower arm 12, an upper arm 13, and a wrist 14. Each individual joint of the robot 10 is driven by a motor 20. The robot 10 is an industrial robot used for various purposes, such as machining, welding, conveying, and the like.

Figure 2:
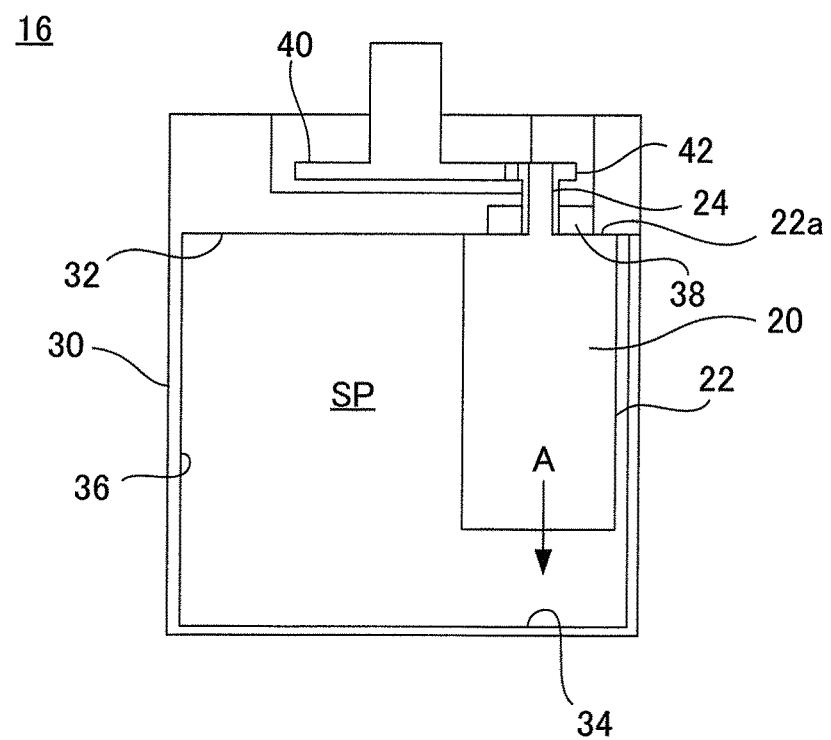
FIG. 2 is a schematic diagram showing a joint unit of the robot according to the one embodiment.

FIG. 2 is an enlarged view showing a joint unit of the robot 10. The joint unit 16 includes the motor 20 and a speed reduction mechanism 40. The motor 20 is provided with a gear 42 at the end of a motor shaft 24. The gear 42 rotates in integral fashion with the motor shaft 24.

The speed reduction mechanism 40 has a known structure used to transmit power to another member by reducing the rotating speed of the motor 20. The speed reduction mechanism 40 is, for example, a gear that engages with the gear 42 of the motor 20. The speed reduction mechanism 40 has a diameter larger than that of the gear 42 and reduces the rotating speed of the motor 20 by cooperatively working with the gear 42.

The motor 20 and the speed reduction mechanism 40 are supported by a supporting member 30 mounted to the robot 10. The supporting member 30 is a housing-like hollow member which defines an interior space SP for accommodating the motor 20. The motor 20 is introduced into the supporting member 30 through the interior space SP for mounting to the supporting member 30, and is removed from the supporting member 30 through the interior space SP for inspection or replacement.

The interior space SP is defined by a top face 32 located near the speed reduction mechanism 40 and spreading in a plane perpendicular to the motor shaft 24 so as to oppose the motor 20, a bottom face 34 located opposite the top face 32, and side faces 36 connecting the top face 32 and the bottom face 34 to each other. In this patent specification, it is to be noted that the terms "top face" and "bottom face" are used only for convenience based on the illustrated positional relationship and are not intended to limit the positional relationship in actual use.

As shown in FIG. 2, the motor 20 is mounted to the top face 32 of the interior space SP of the supporting member 30 by known mounting means, for example, by screws. According to the present embodiment, a recessed portion 38 recessed in the protruding direction of the motor shaft 24 is formed in the top face 32 in a position corresponding to the position of the motor shaft 24. Further, as can be seen by also referring to FIG. 3, the recessed portion 38 is formed in the shape of a groove extending from the mounting position of the motor 20 to one side face 36 in a direction perpendicular to the motor shaft 24.

A through-hole through which the motor shaft 24 and the gear 42 attached to the motor shaft 24 are to be inserted is formed passing through the recessed portion 38. The gear 42 is connected to the speed reduction mechanism 40 at a position protruding from the through-hole. As will be described later, the recessed portion 38 is dimensioned to have a width larger than the diameter of the gear 42 in order to form a space through which the motor shaft 24 and the gear 42 can pass.

The recessed portion 38 is dimensioned to have a depth such that the dimension between the recessed portion 38 and a component (for example, the bottom face 34) of the robot 10 located at the shortest distance from the recessed portion 38 as measured in a direction parallel to the motor shaft 24 becomes larger than the overall length of the motor 20 including the motor shaft 24.

The advantageous effect of the joint unit 16 constructed in accordance with the present embodiment will be described with reference to FIG. 4. FIG. 4 shows the joint unit 16 as viewed from the open face (front face) side of the supporting member 30 shown in FIG. 3. FIG. 4 also shows the condition in which the motor 20 is disengaged from the supporting member 30 in the axis direction (indicated by arrow A in FIG. 2) of the motor 20.

Figure 3:
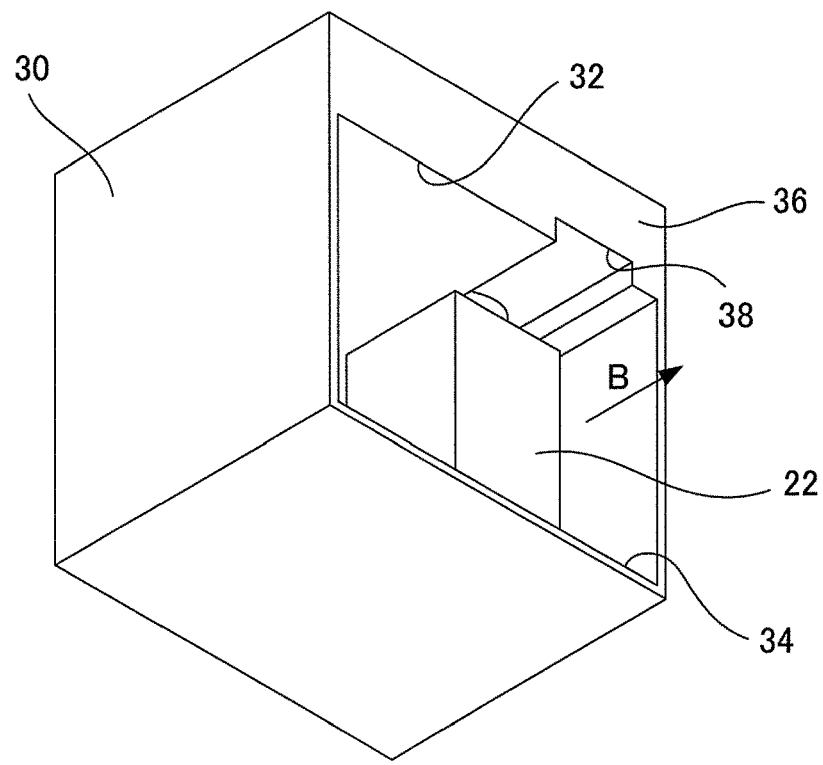
FIG. 3 is a perspective view showing the joint unit according to the embodiment shown in FIG. 2.
Figure 4:
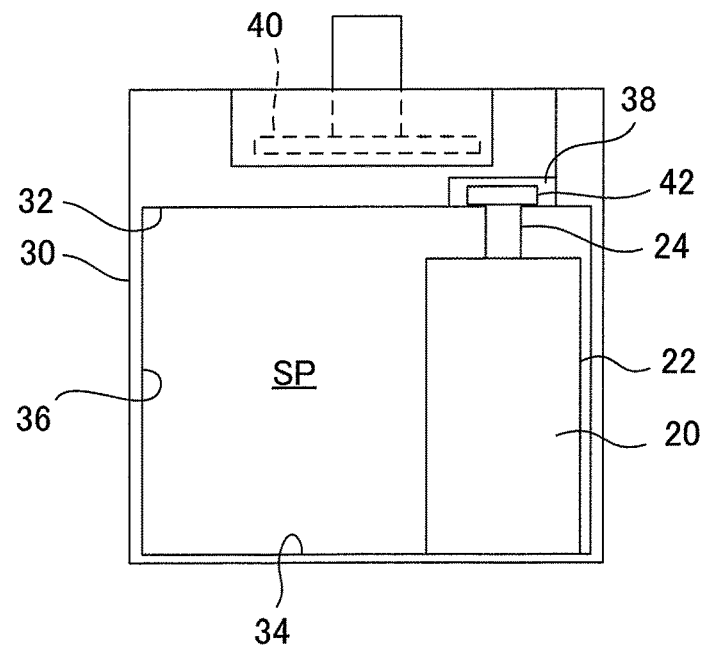
FIG. 4 is a front view showing the joint unit according to the embodiment shown in FIG. 2.

According to the present embodiment, the motor 20 can be removed from the supporting member 30 by slidingly moving the motor 20 toward the viewer of FIG. 4 (in the direction indicated by arrow B in FIG. 3). More specifically, the gear 42 and the motor shaft 24 protruding from the body 22 of the motor 20 can be moved in sliding fashion along the recessed portion 38 formed in the supporting member 30.

Likewise, when introducing the motor 20 into the supporting member 30, the motor 20 can be assembled to the supporting member 30 by slidingly moving the motor 20 with the motor shaft 24 and the gear 42 slid into the recessed portion 38.

In this way, using the supporting member 30 formed with the recessed portion 38 in accordance with the present embodiment, the space necessary for moving the motor 20 can be increased by an amount equal to the depth of the recessed portion 38 without changing the external shape of the supporting member 30. Stated another way, the supporting member 30, and hence the joint unit 16, can be reduced in size while guaranteeing that the motor 20 can be easily removed from the supporting member 30 or easily introduced into the supporting member 30.

Figure 5:
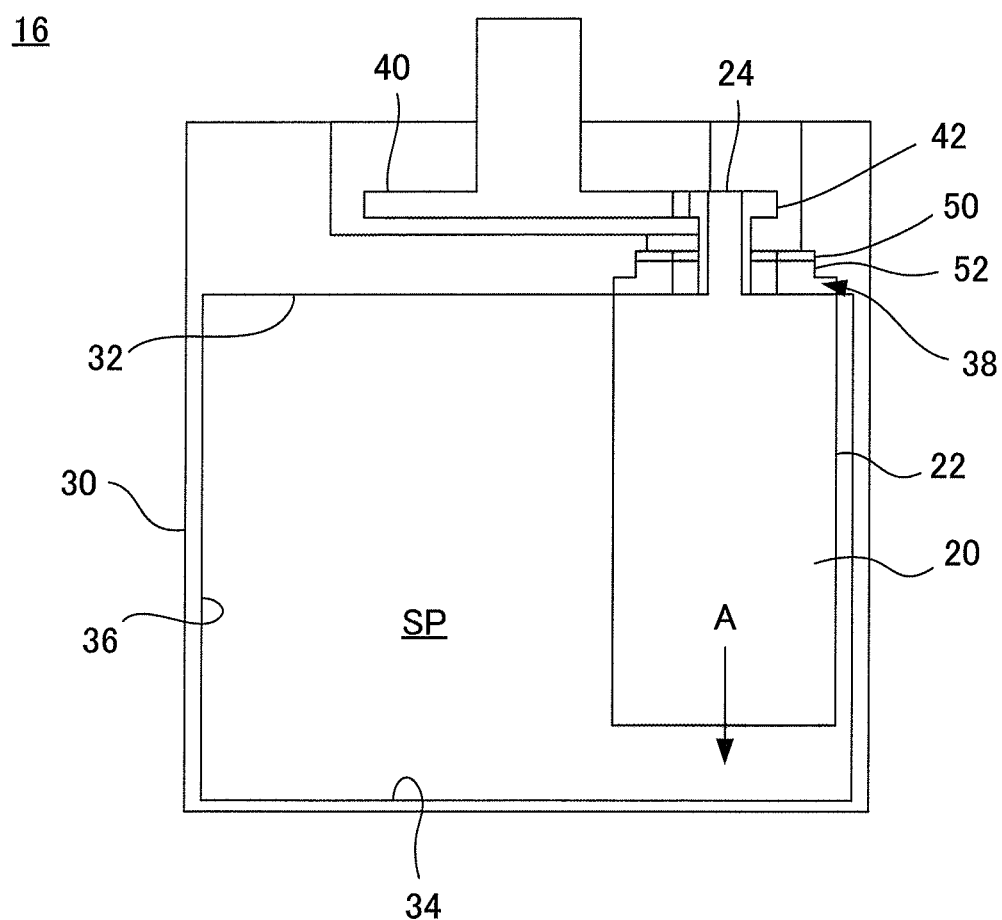
FIG. 5 is a schematic diagram showing a joint unit of a robot according to an alternative embodiment.

FIG. 5 shows a joint unit 16 according to an alternative embodiment. In this embodiment, a sealing member 50 is used to seal the lubricant used in the speed reduction mechanism 40. The sealing member 50 is provided between the motor 20 and the recessed portion 38 to separate the space surrounding the speed reduction mechanism 40 from the interior space SP of the supporting member 30.

The motor 20 is provided with an adapter 52 around the motor shaft 24. The adapter 52 is dimensioned to match the shape of the recessed portion 38 formed in the top face 32 of the supporting member 30. When mounting the motor 20 to the supporting member 30, the adapter 52 allows a sufficient pressing force to be applied to the sealing member 50 and the recessed portion 38 so that the required sealing effect can be achieved.

The adapter 52 may be assembled into the motor 20 to form a single unit together with the motor 20. In this case, when replacing the motor 20, the adapter 52 is removed from the supporting member 30 in an integral fashion with the motor 20.

Figure 6:
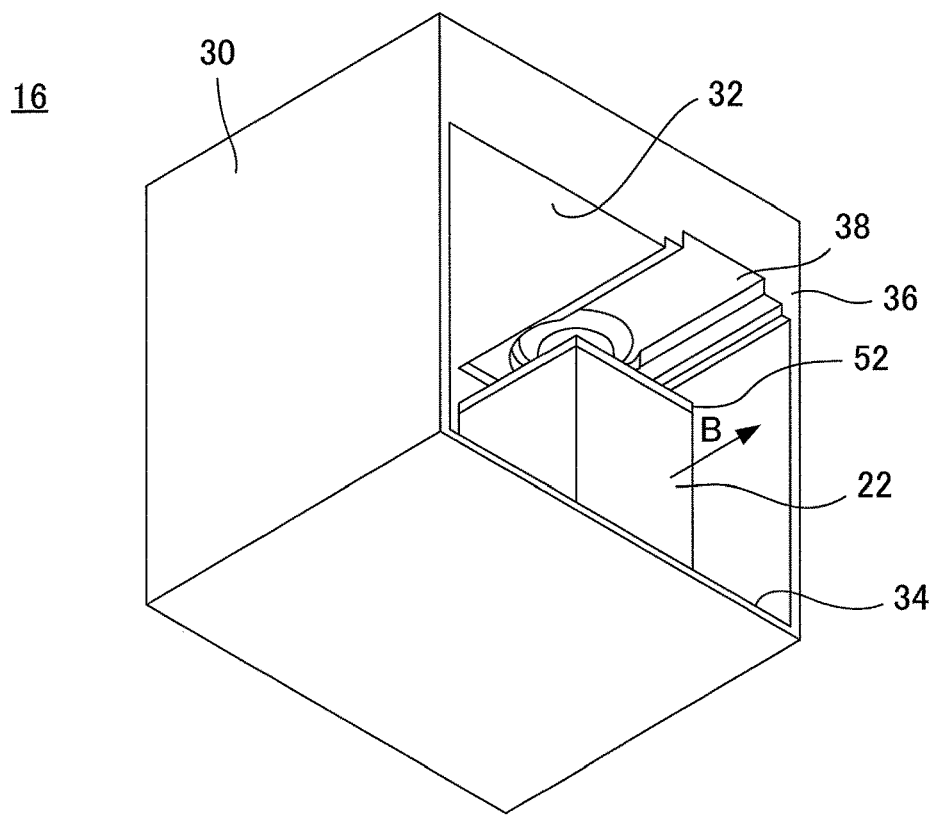
FIG. 6 is a perspective view showing the joint unit according to the embodiment of FIG. 5.
Figure 7:
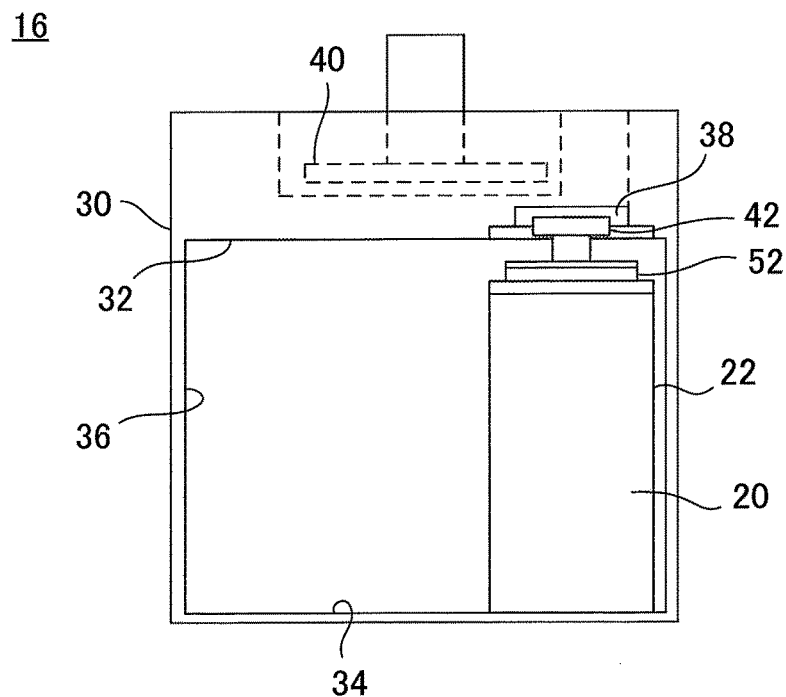
FIG. 7 is a front view showing the joint unit according to the embodiment of FIG. 5.

FIGS. 6 and 7 show the joint unit 16 when the motor 20 is moved in the axis direction (indicated by arrow A in FIG. 6) of the motor 20. As in the foregoing embodiment, since the motor shaft 24 and the gear 42 attached to the end of the motor shaft 24 can be moved in sliding fashion along the recessed portion 38, the motor 20 can be removed from the supporting member 30 without interfering with the supporting member 30.

Figure 8:
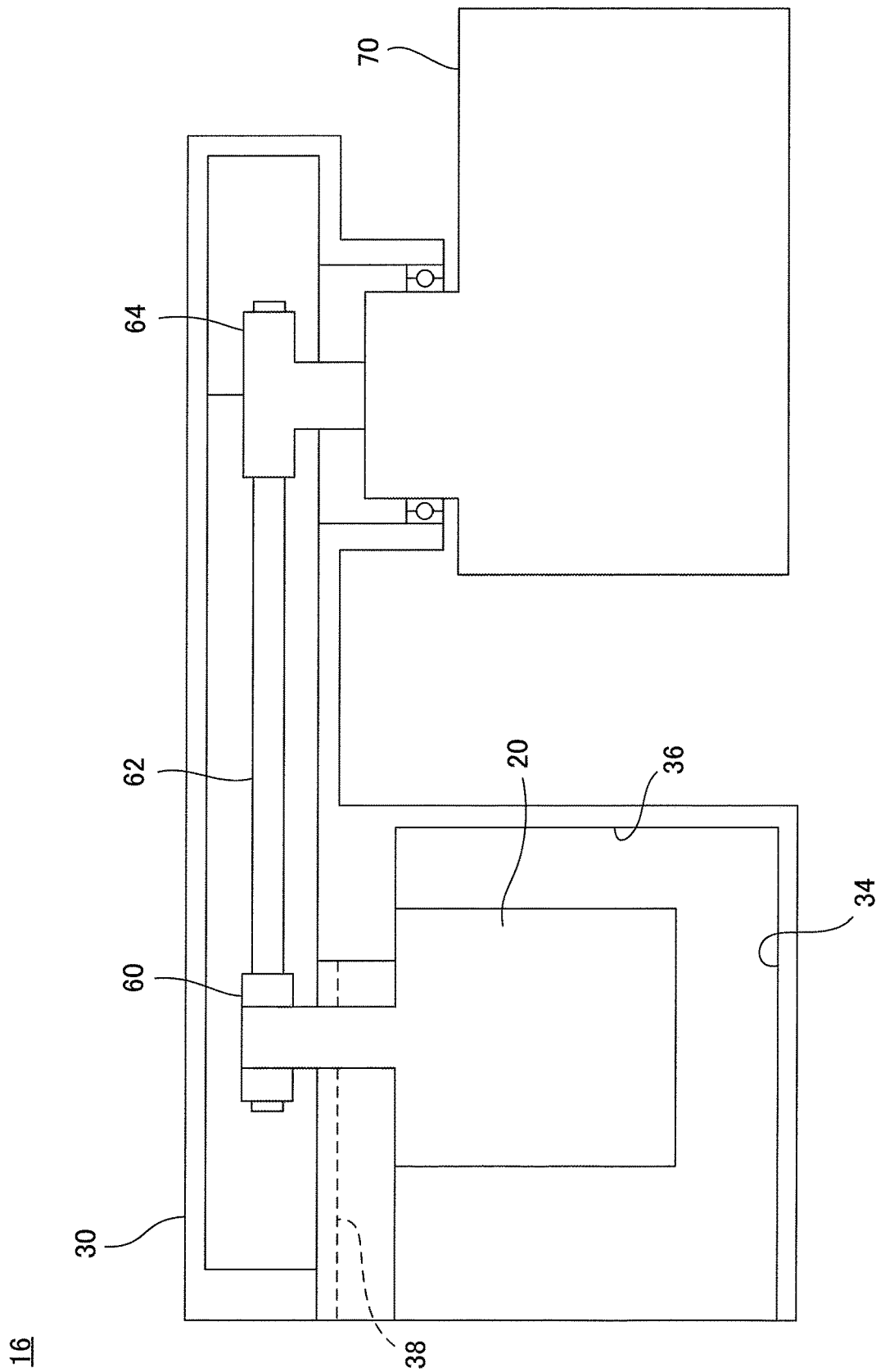
FIG. 8 is a diagram showing a configuration example of the joint unit according to the one embodiment.

FIG. 8 shows a configuration example of the joint unit 16 according to the present embodiment. In this example, the speed reduction mechanism is constructed from a combination of a pulley and a belt. More specifically, the motor 20 is provided with a first pulley 60 at the end of the motor shaft 24. The first pulley 60 is connected to a second pulley 64 on the output side via a belt 62. In this way, the rotation of the motor 20 is transmitted to a driven member 70 via the speed reduction mechanism.

Figure 9:
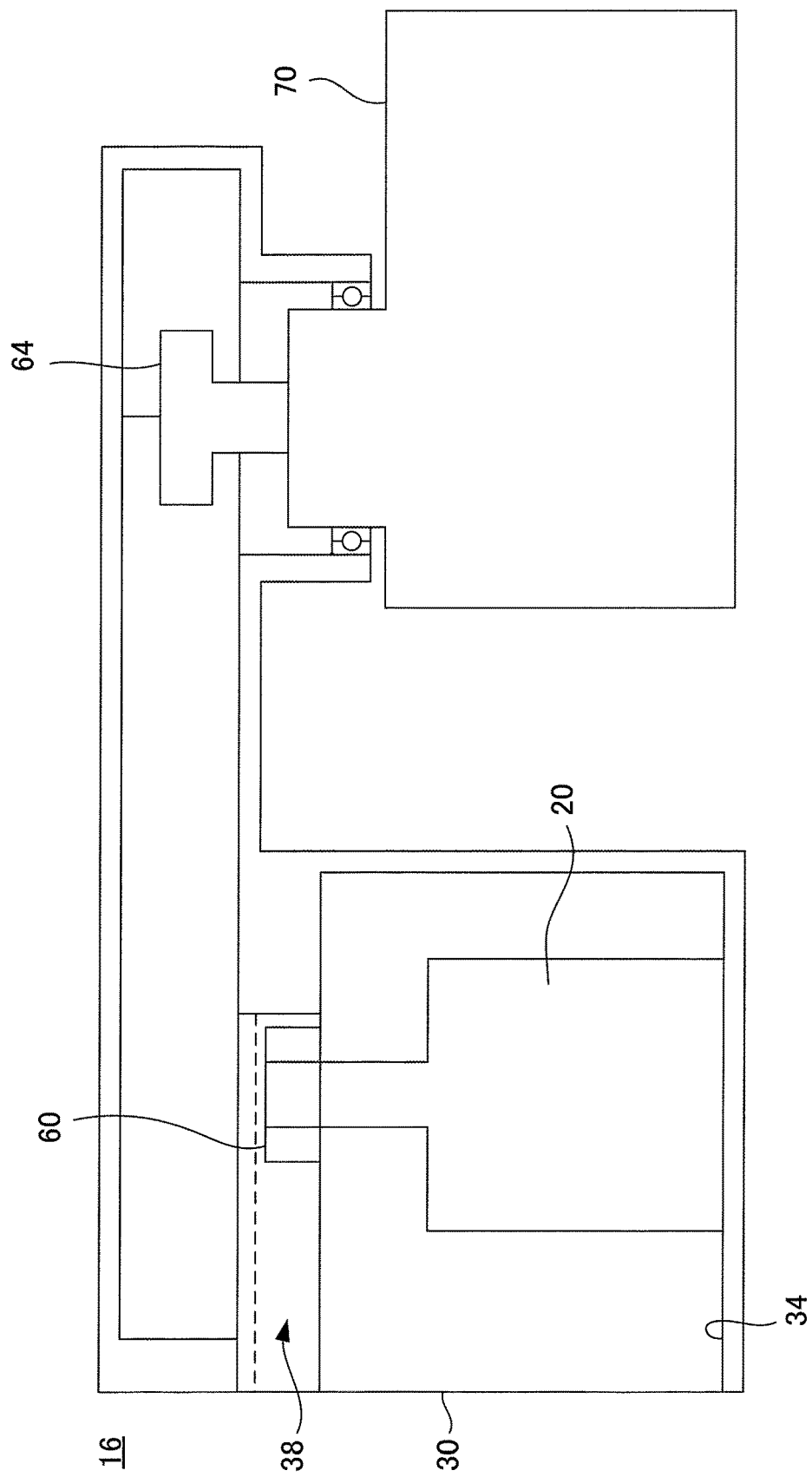
FIG. 9 is a diagram showing the joint unit according to the embodiment of FIG. 8.

FIG. 9 shows the condition in which the motor 20 is detached from the supporting member 30 in the joint unit 16 shown in FIG. 8. As shown, the overall length of the motor 20 is shorter than the distance between the recessed portion 38 and the bottom face 34 of the supporting member 30. Further, the recessed portion 38 is dimensioned to have a width larger than that of the first pulley 60. Accordingly, when drawing the motor 20 out of the supporting member 30, or when introducing the motor 20 into the supporting member 30, the motor 20 is moved by letting the first pulley 60 into the recessed portion 38.

Figure 10:
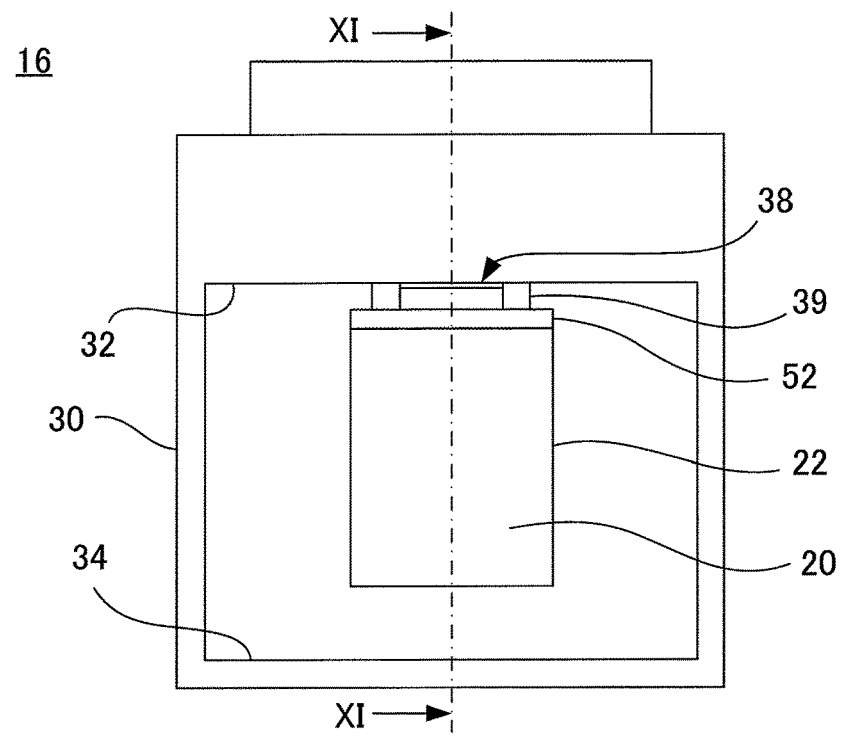
FIG. 10 is a diagram showing another configuration example of the joint unit according to the alternative embodiment.
Figure 11:
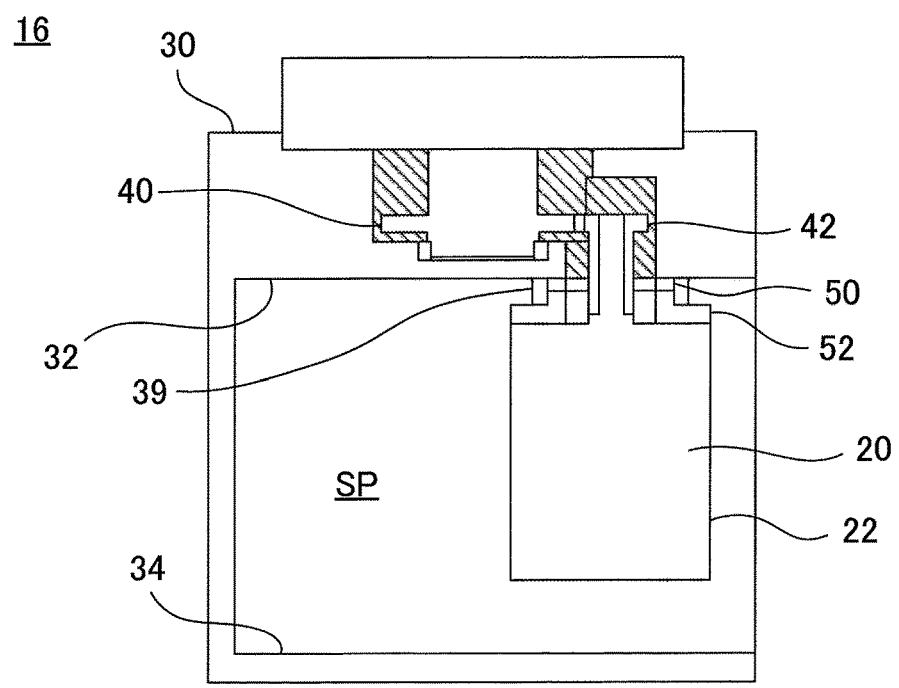
FIG. 11 is a cross-sectional view taken along line XI-XI of FIG. 10.

FIGS. 10 and 11 show another configuration example of the joint unit 16 according to the present embodiment. FIG. 11 is a cross-sectional view taken along line XI-XI of FIG. 10. In this example, the gear 42 attached to the motor shaft 24 of the motor 20 is configured to engage with the speed reduction mechanism 40.

Referring to FIG. 11, the space around the speed reduction mechanism 40 is formed to provide a grease path for lubricating the gear engagement. In FIG. 11, the grease path is indicated by hatching.

To prevent the grease from leaking into the interior space SP, a sealing member 50 is provided between the motor 20 and the recessed portion 38. The motor 20 includes an adapter 52 which is attached to the body 22 at a position from which the motor shaft 24 protrudes. A pressing force is applied to the sealing member 50 via the adapter 52 so that the desired sealing effect can be achieved.

In the illustrated embodiment, the recessed portion 38 is formed in an adapter mounting portion 39 which is formed protruding from the top face 32 of the interior space SP. The adapter mounting portion 39 is dimensioned to match the external shape of the adapter 52 so that the adapter 52 is fitted into the adapter mounting portion 39 when the motor 20 is assembled to the supporting member 30.

Figure 12:
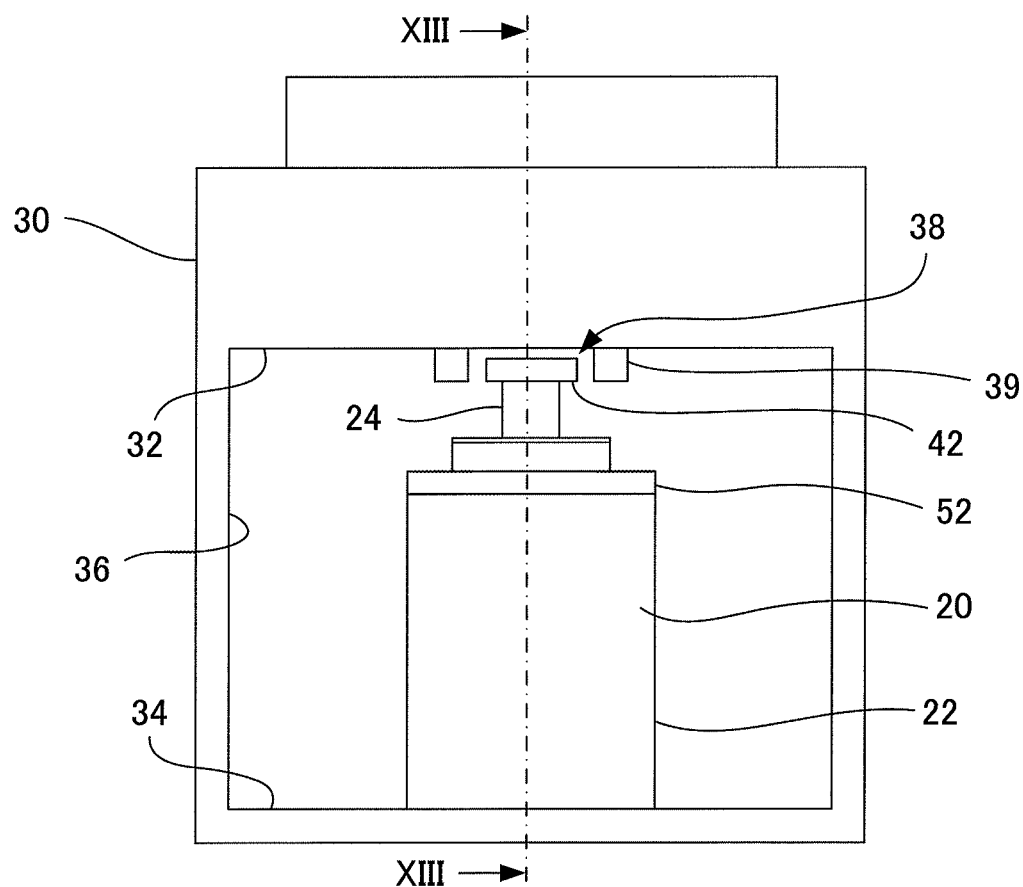
FIG. 12 is a diagram showing the joint unit according to the embodiment of FIG. 10.
Figure 13:
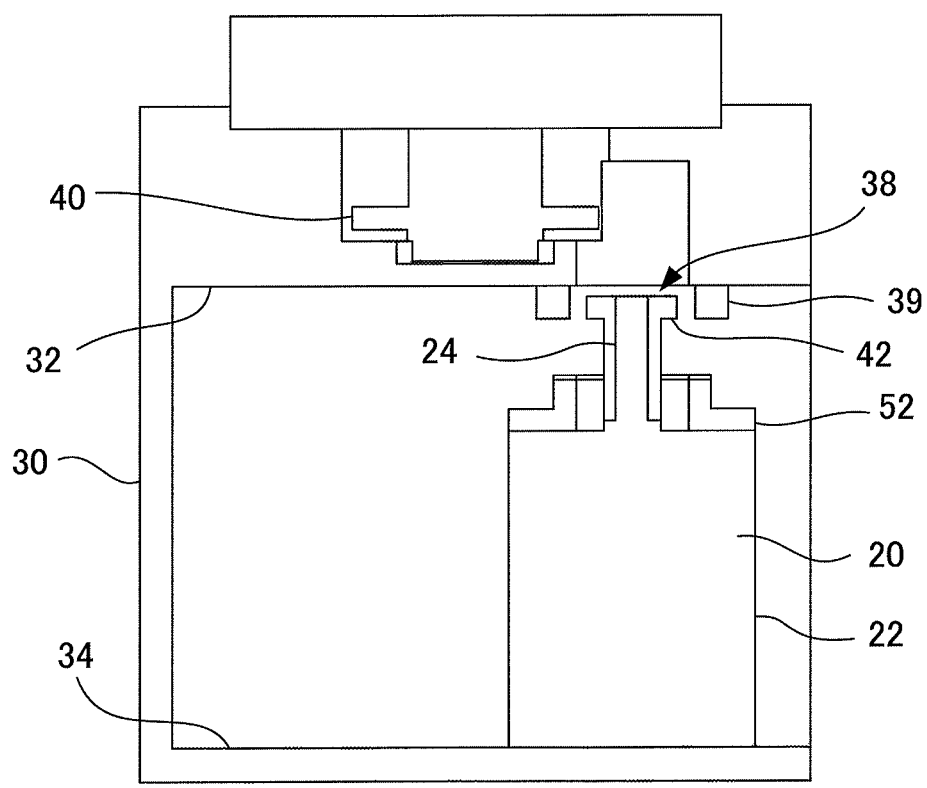
FIG. 13 is a cross-sectional view taken along line XIII-XIII of FIG. 12.
Figure 14:
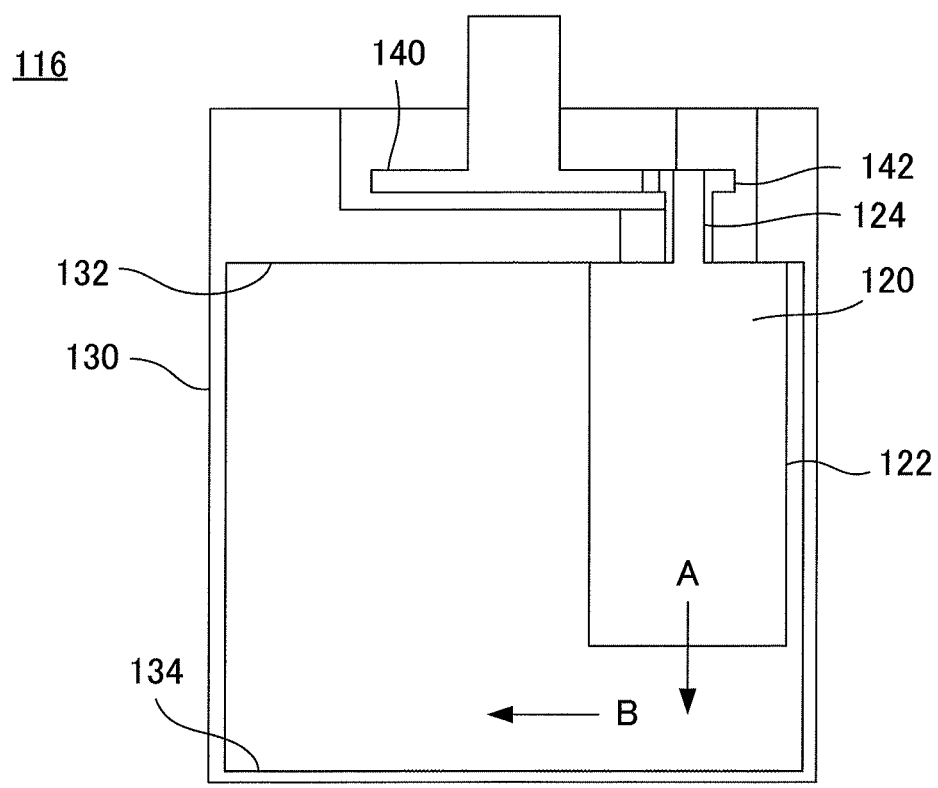
FIG. 14 is a diagram showing a joint unit of a robot according to the prior art.
Figure 15:
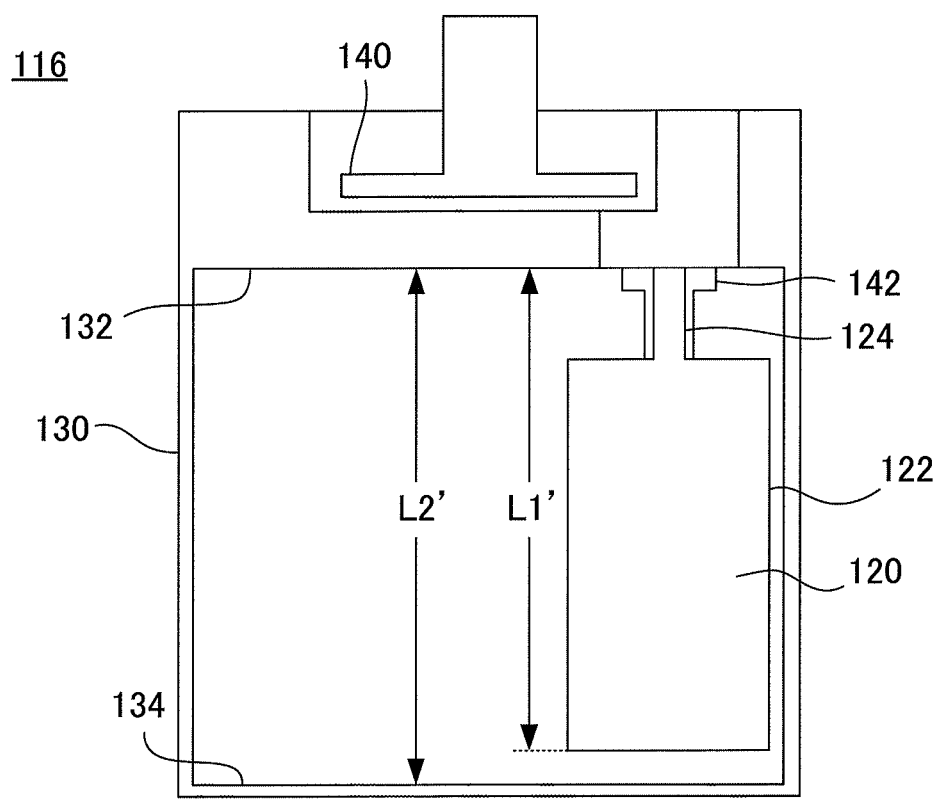
FIG. 15 is a diagram showing a joint unit of a robot according to the prior art.
Figure 16:
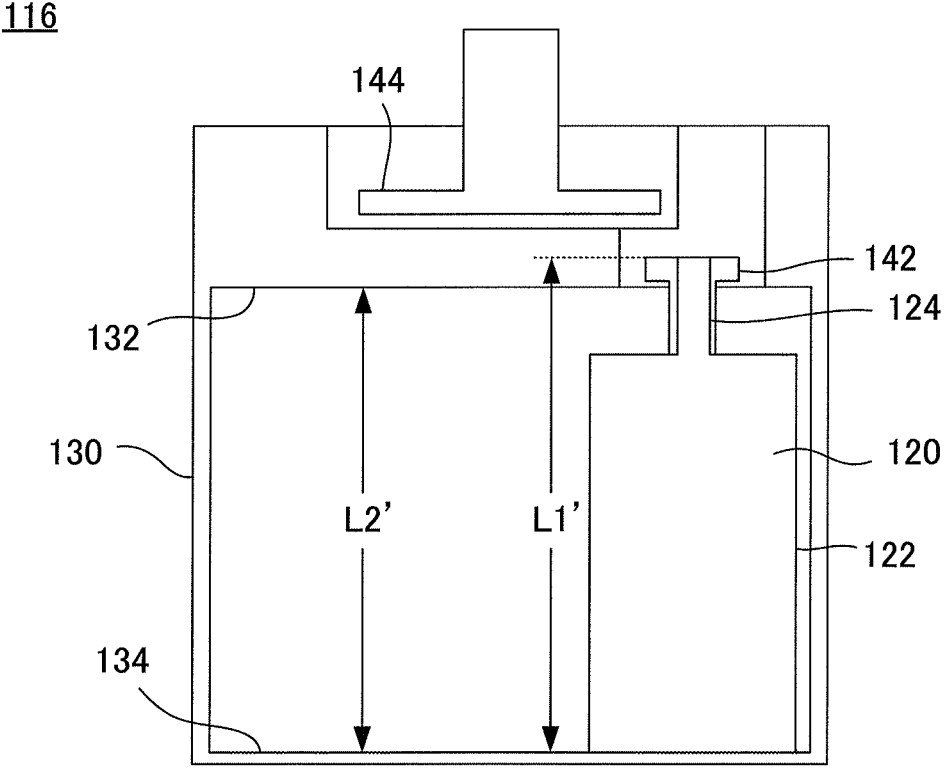
FIG. 16 is a diagram showing a joint unit of a robot according to the prior art.
Figure 17:
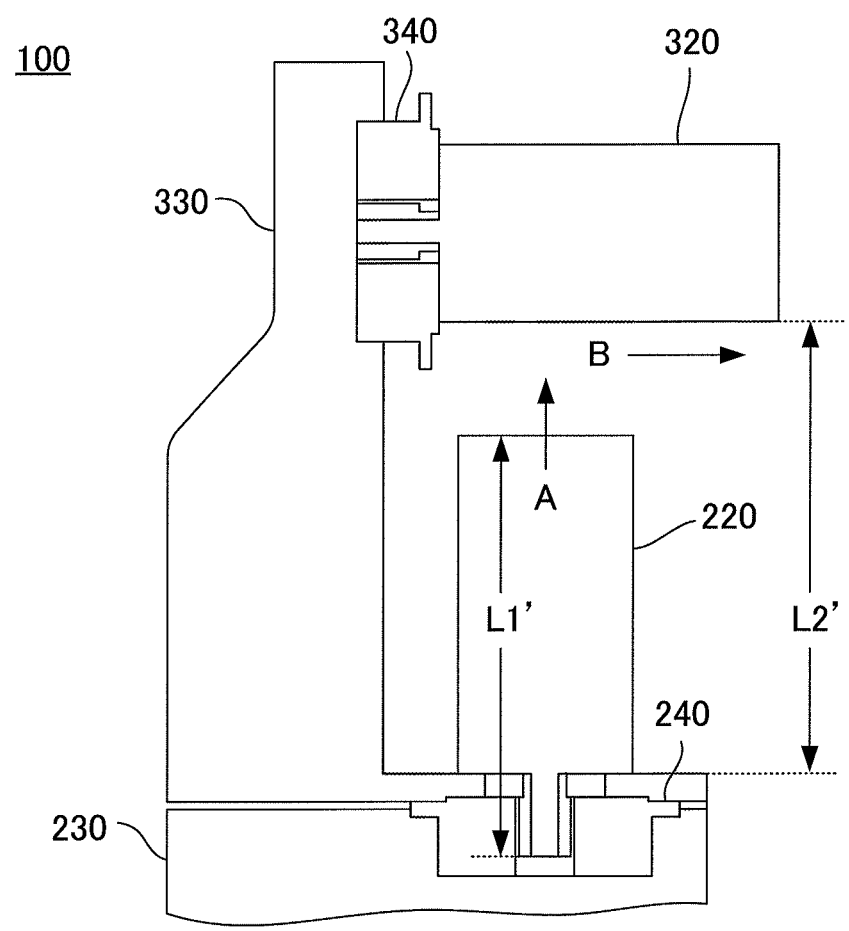
FIG. 17 is a diagram showing a portion of the configuration of a robot according to the prior art.
Figure 18:
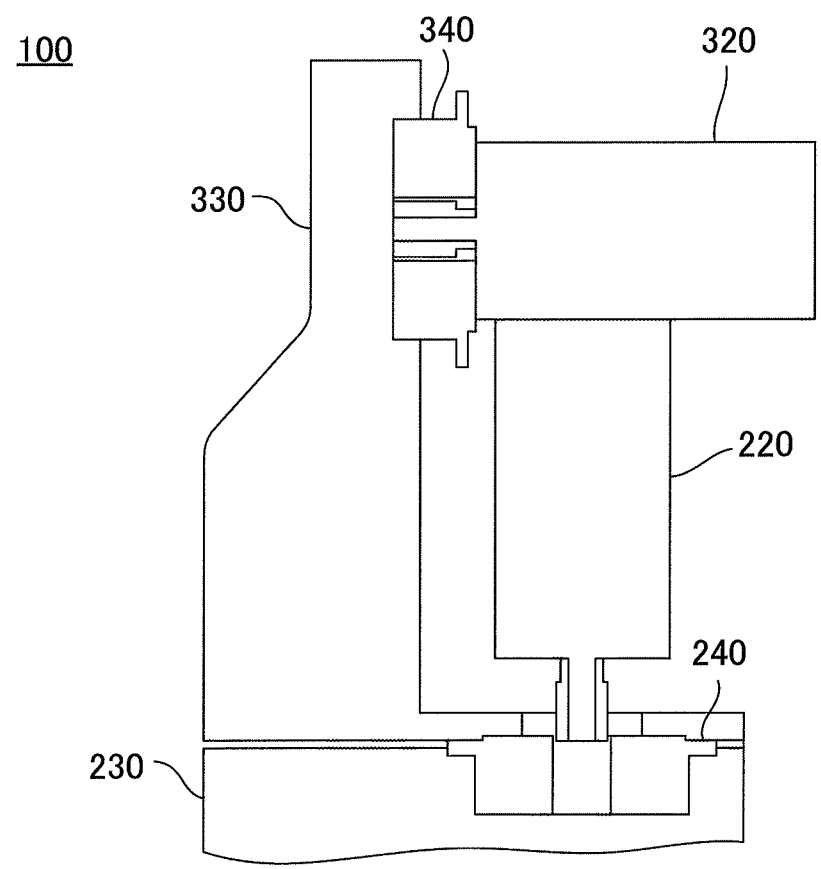
FIG. 18 is a diagram showing a portion of the configuration of a robot according to the prior art.
Figure 19:
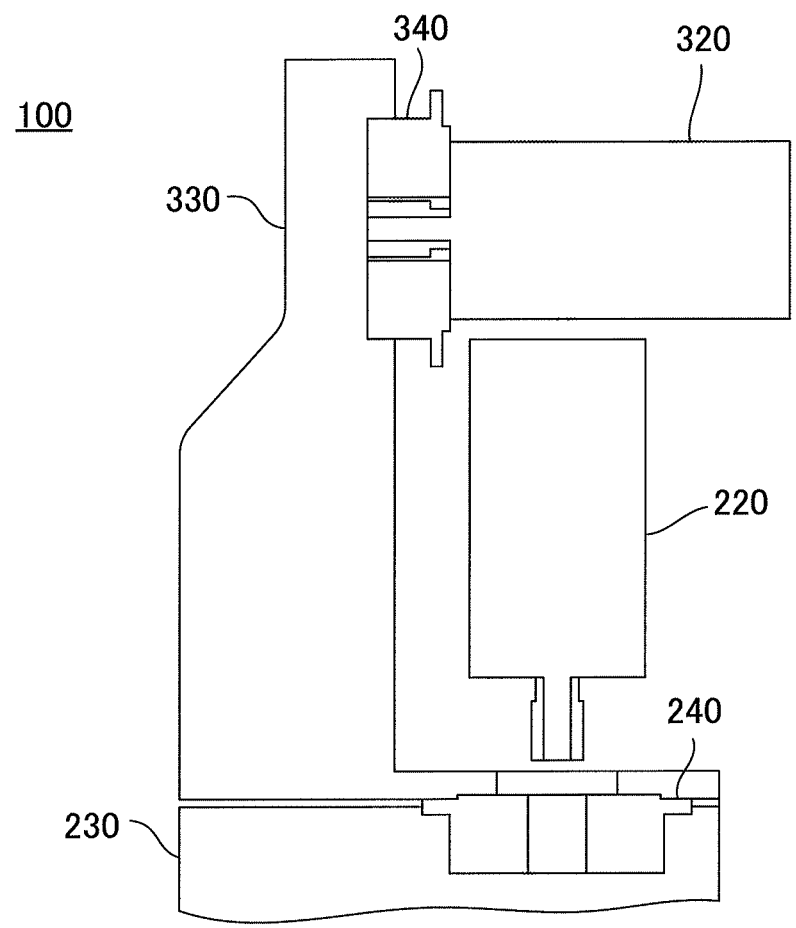
FIG. 19 is a diagram showing a portion of the configuration of a robot according to the prior art.

As shown in FIGS. 12 and 13, the motor shaft 24 and the gear 42 are allowed to move along the recessed portion 38 formed in the adapter mounting portion 39. Accordingly, as in the foregoing embodiment, it becomes possible to reduce the size of the joint unit of the robot while guaranteeing that the motor 20 can be easily removed from the supporting member or easily introduced into the supporting member.

While various embodiments of the present invention have been described above, those skilled in the art will recognize that the effects and advantages intended by the present invention can also be achieved by other embodiments. In particular, it is possible to omit or replace some of the component elements of the above embodiments or add some known means thereto without departing from the scope of the invention. It is also apparent to those skilled in the art that the invention can also be carried out by suitably combining the features of a plurality of embodiments explicitly or implicitly disclosed in this patent specification.

According to the robot of the present invention, by employing the supporting member with the recessed portion formed in its opposing face opposing the motor, the motor can be removed from the supporting member or introduced into the supporting member by letting the forward end of the motor into the space of the recessed portion. This serves to reduce the size of the robot while preventing the motor from interfering with any component of the robot when replacing the motor.

The invention claimed is:

1. An articulated industrial robot comprising:
   a motor which is provided with a gear or a pulley at an end of a motor shaft, and which generates a force for driving a joint;
   a speed reduction mechanism which reduces the speed of rotation of the gear or pulley rotating integrally with the motor shaft; and
   a supporting member which supports the motor and the speed reduction mechanism, and which defines an interior space for accommodating the motor,
   wherein the supporting member has an opposing face opposing the motor in the interior space,
   wherein the opposing face spreads in a plane perpendicular to a central axis of the motor shaft,
   wherein the opposing face includes a groove-like recessed portion recessed in a protruding direction of the motor shaft and extending in a direction perpendicular to the central axis of the motor shaft,
   wherein the recessed portion has a width larger than a diameter of the gear or pulley,
   wherein the recessed portion has a depth such that a dimension between the recessed portion and a component of the articulated robot located at the shortest distance from the recessed portion as measured in a direction parallel to the central axis of the motor shaft becomes larger than an overall length of the motor including the gear or pulley and the motor shaft, wherein the recessed portion has a through-hole through which the motor shaft and the gear or pulley can be inserted, and wherein the motor can be removed for replacement by sliding the motor in a direction of the central axis to position the gear or pulley in the recessed portion and then sliding the motor in a direction perpendicular to the central axis in the recessed portion.

2. The articulated robot according to claim 1, wherein the gear or pulley is connected to the speed reduction mechanism at a position protruding from the through-hole.

3. The articulated robot according to claim 1, further comprising a sealing member which is provided between the recessed portion and the motor.

4. The articulated robot according to claim 1, wherein the maximum outer diameter of the motor is larger than the width of the recessed portion, and the output side end face of the motor is supported on the opposing face of the supporting member.

5. The articulated robot according to claim 1, wherein the motor is provided with an adapter around the motor shaft, the adapter is dimensioned to match the shape of the recessed portion, and the output side end face of the motor is supported in the recessed portion via the adapter.

6. The articulated robot according to claim 1, wherein the motor is provided with an adapter around the motor shaft, the adapter is dimensioned to match the shape of the recessed portion, the recessed portion is formed in an adapter mounting portion which is formed protruding from the opposing face of the supporting member, and the output side end face of the motor is supported on the adapter mounting portion via the adapter.

* * * * *